United States Patent [19]

Sine

[11] Patent Number: 5,586,483
[45] Date of Patent: Dec. 24, 1996

[54] PISTON AND ROD ASSEMBLY

[75] Inventor: Andrew L. Sine, Lawrenceville, Pa.

[73] Assignee: Dresser-Rand Company, Corning, N.Y.

[21] Appl. No.: 518,630

[22] Filed: Aug. 23, 1995

[51] Int. Cl.⁶ ..................................................... F16J 1/00
[52] U.S. Cl. ......................... 92/255; 123/193.6; 403/197; 403/199
[58] Field of Search .................. 92/139, 255; 123/193.6; 403/189, 197, 199, 238

[56] References Cited

FOREIGN PATENT DOCUMENTS

| | | | |
|---|---|---|---|
| 457239 | 3/1928 | Germany | 123/193.6 |
| 113028 | 9/1981 | Japan | 123/193.6 |
| 51283 | 3/1983 | Japan | 92/255 |

*Primary Examiner*—F. Daniel Lopez
*Attorney, Agent, or Firm*—B. J. Murphy

[57] ABSTRACT

An aluminum piston is mounted onto a steel piston rod by means of an intervening, steel hub. The piston, hollow with an opening at one end, pilotingly receives the hub in the opening. The hub has a throughging bore in which the piston rod is pilotingly received. The rod has a prominent shoulder against which a rim on the hub seats, and a hub nut prestresses the hub against the shoulder. The hub has a flange with a series of bolt holes formed therein, the latter being aligned with a like series of tapped bores in a ledge of the piston. Studs with locknuts, engaged with the holes and bores, make the flange fast to the ledge.

6 Claims, 2 Drawing Sheets

PISTON AND ROD ASSEMBLY

This invention pertains to piston and rod assemblies, such as are employed in reciprocating-piston pumps and gas compressors, and the like, and in particular to a piston and rod assembly of novel construction.

Known piston and rod assemblies, especially those which are of diverse metals, i.e., having an aluminum piston and a steel rod, are susceptible of problems due to the fact that the diverse metals have differing modes of thermal expansion. Consequently, difficulties such as distortion, warping, and such, are experienced by the prior art assemblies. Fabrication of the assemblies of a common metal, such as aluminum, is unacceptable as the aluminum rod would lack sufficient strength, and construction thereof of steel renders the piston too weighty.

What has been needed is an acceptable manner of constructing a piston and rod assembly, not subject to distortion due to thermal effects, in which the piston can be formed of aluminum and the rod of steel.

It is an object of this invention to set forth just such a long sought or needed piston and rod assembly.

Particularly, it is an object of this invention to disclose a novel piston and rod assembly comprising a hollow piston, having (a) an axis, and (b) an opening formed in one axial end thereof, with (c) an annular ledge rimming said opening; wherein said ledge has a given plurality of tapped bores formed therein; and an annular hub, also having the same, given plurality of bolt holes formed therein; said hub having a circumferential surface which pilotingly receives said piston opening thereabout; and fasteners set in said holes and fastened in said bores securing said hub to said ledge; a piston rod, having a prominent shoulder formed thereon, and being threaded at one end thereof; wherein said hub has (a) a throughgoing bore which pilotingly receives said piston rod therein, and (b) a rim for seating thereof against said shoulder; and a nut threadedly torqued onto said one end of said rod and fastening said rim of said hub against said shoulder.

Further objects of this invention, as well as the novel features thereof, will become apparent by reference to the following description, taken in conjunction with the accompanying figures, in which.

Figure 1:
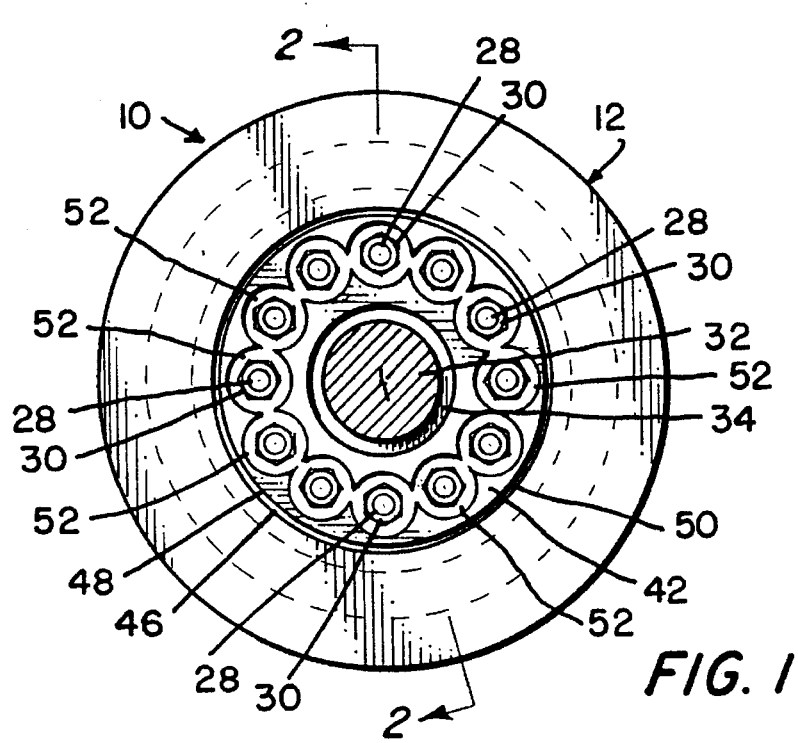
FIG. 1 is an end view of a first embodiment of the invention.
Figure 2:
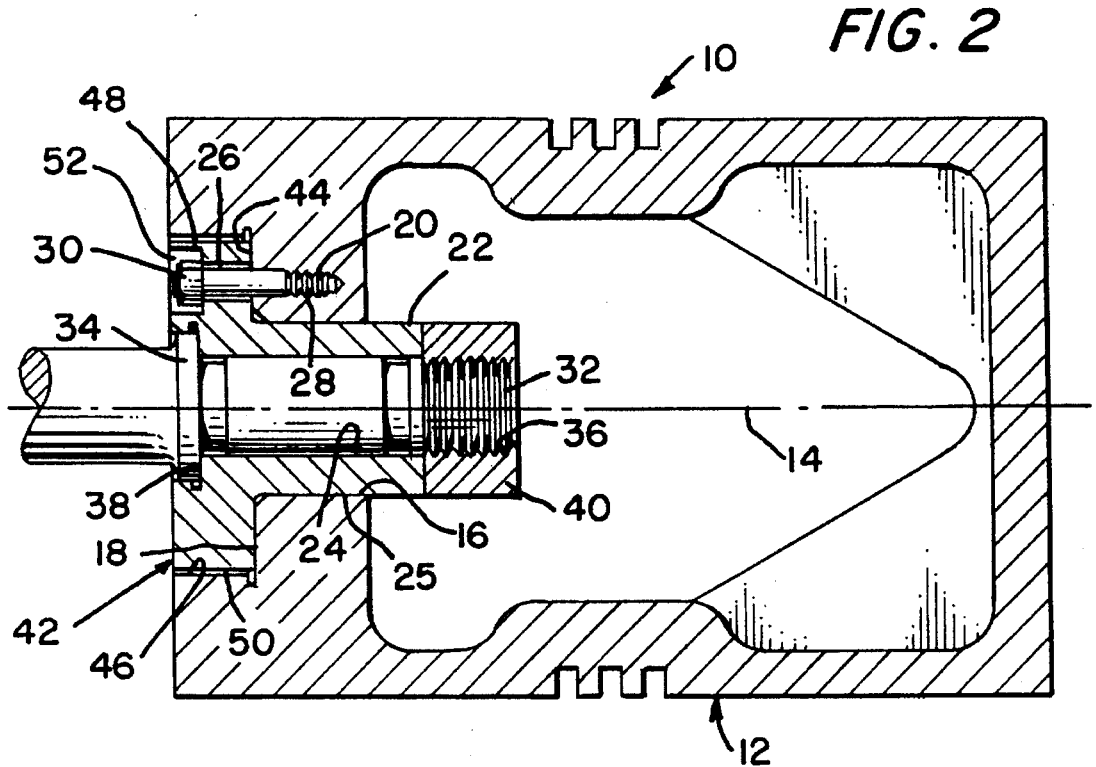
FIG. 2 is an axial cross-sectional illustration of the FIG. 1 embodiment, the same taken along section 2—2 of FIG. 1.

As shown in FIGS. 1 and 2, a first embodiment 10 of the novel piston and rod assembly comprises a hollow, aluminum piston 12 having an axis 14, and an opening 16 formed in one axial end thereof. An annular ledge 18 rims the opening, and has a plurality of tapped bores 20 formed therein. A hub 22, which has a throughgoing bore 24 formed therein, is set in said opening 16. The hub 22 has a circumferential surface 25 which pilotingly receives the piston opening 16 thereabout. The hub 22, which is formed of steel, has a plurality of bolt holes 26 formed therein, the same being of the same number as the bores 20, and aligning with the latter. Studs 28 are threaded into the bores 20 and in penetration of the holes 26, and have nuts 30 torqued thereon. A piston rod 32, having a prominent shoulder 34 formed thereon, and being threaded at an end 36 thereof, is pilotingly received in said hub 22 via the bore 24. The hub 22 has a rim 38 which sets against the shoulder 34, and a nut 40 is threadedly torqued onto the end 36 of the rod 32 fastening the rim 38 against the shoulder 34.

The rod 32 is formed of steel, the same as the hub 22, and yet the hub 22 is minutely spaced apart from the aluminum piston 12. The hub 22 has a flange 42 which is nested in a recess 44 formed in the piston 12. The recess 44 has a circular wall surface 46 of a given diameter, and the flange 42 has a peripheral surface 48, confronting the wall surface 46, with a diameter slightly less than said given diameter, to define a minute space 50 between the surfaces 46 and 48.

For assembly, the hub 22 is placed on the rod 32 and made fast thereon by the nut 40. Then the rod 32, hub 22 and nut 40 are inserted into the opening 16 of the piston 12. The hub 22 is seated in the recess 44 against the flat, land surface of the recess 44 which defines ledge 18 in which tapped bores 20 are formed. The studs 28 are threaded into the bores 20, and the nuts 30 are tightened onto the studs 28 to fix the hub securely to the piston 12. The flange 42 has a series of countersunk holes 52 formed therein in which to confine the stud nuts 30.

Figure 3:
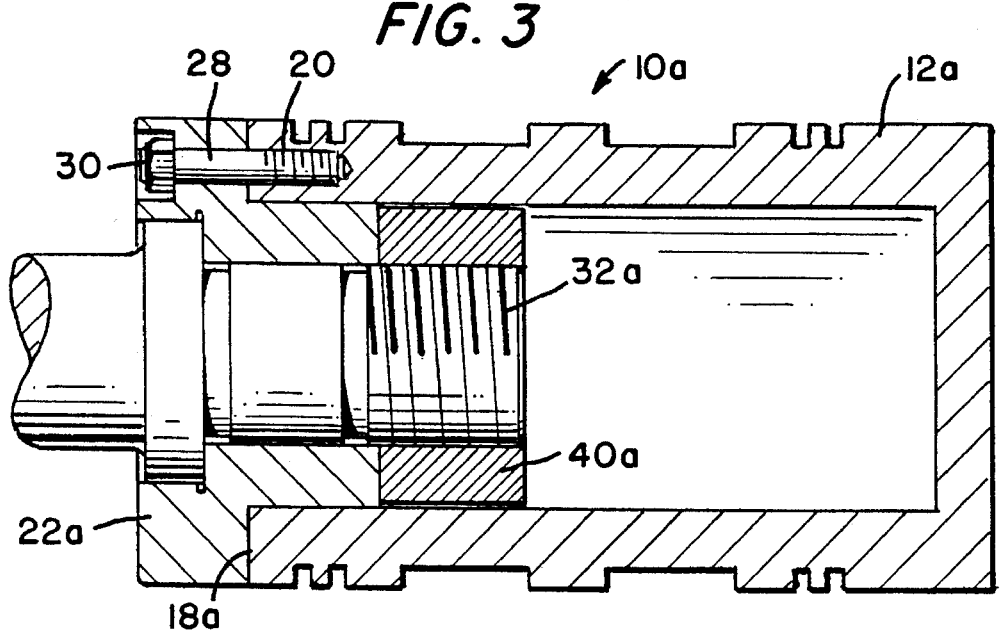
FIG. 3 is a cross-sectional view of an alternate embodiment of the invention.

In FIG. 3, where an alternative embodiment 10a of the invention is shown, same or similar index numbers denote same or similar components as indexed in FIGS. 1 and 2.

In the FIG. 3 embodiment 10a, the ledge 18a, in which the tapped bores 20 are formed, comprises an axial end of the piston 12a. Excepting for that difference, the construction of embodiment 10a is substantially the same as that of embodiment 10.

Figure 4:
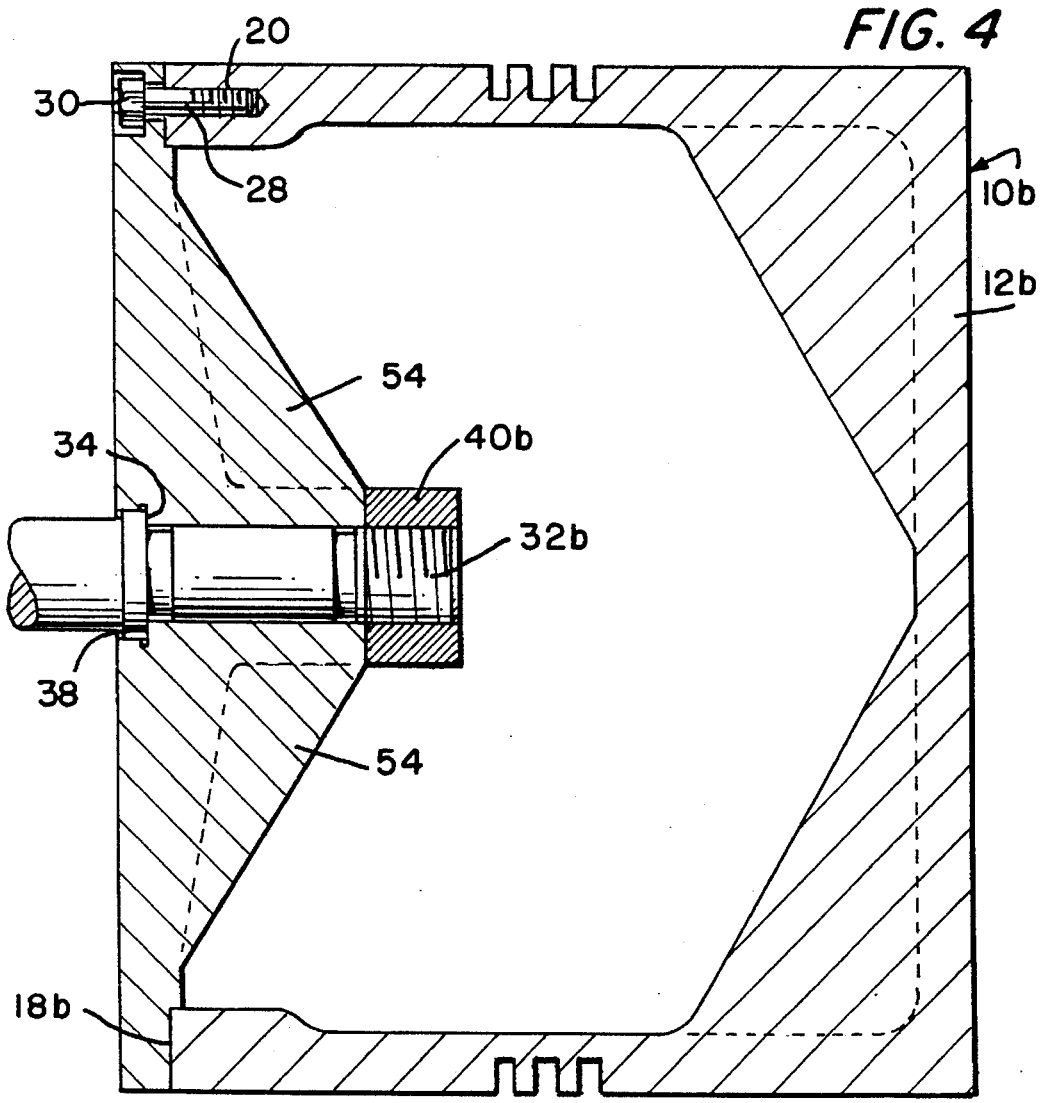
FIG. 4 is a cross-sectional depiction of yet another embodiment of the invention.

FIG. 4 illustrates yet a further embodiment 10b of the invention and, again, same or similar index numbers signify same or similar components as are so indexed in FIGS. 1 and 2.

Embodiment 10b, the same as with embodiment 10a, has its ledge 18b, in which the tapped bores 20 are formed, at an axial end of the piston 12b. In addition, however, the hub 22b has a plurality of radially disposed, rigidizing ribs 54 formed thereon.

As noted in the foregoing, the piston 12 (and 12a and 12b) is formed of aluminum, whereas the rod 32 (and 32a and 32b) and hub 22 (and 22a and 22b) are formed of steel. Conventional designs of piston and rod assemblies have the piston clamped between a flange or collar on the piston rod at one end of the piston, and a nut or collar at the other end. Because aluminum grows more with heat than the steel rod, high stresses result. Some current designs seek to equalize this growth by using inert minovar spacers, or iron or steel collars in place of some aluminum in the piston hub. These expedients add cost and some significant weight to the assembly, sometimes defeating the benefit of using an aluminum piston in the first place. This is especially true of small bore, long pistons. Another drawback is that large amounts of cylinder clearance are added around the spacers.

Conventional, prior art pistons commonly require a large hub section through the center. This is true for aluminum, cast iron and steel pistons. This hub section can be quite large, depending upon the requirements, and in the case of small diameter pistons will account for much of the piston weight. Too, assembly and disassembly of conventional, prior art piston and rod assemblies require special equipment to hold the piston rod and engage the nut, and to tighten the nut very large components, and long pistons with high tightening angles can be especially difficult to service.

My invention solves the aforecited problems by attaching and aligning the piston to the rod at one end. This allows infinite thermal growth, eliminates all the weight of the hub section, and reduces fixed cylinder clearance around the piston. Also, removing and installing the piston is easily done using common hand tools. In addition, some material savings are realized because the piston rod length is reduced and spacers are omitted.

As explained in the foregoing, the hub 22 (and 22a and 22b) pilots on the rod 32 (and 32a and 32b), and the piston 12 (and 12a and 12b) pilots on the hub. As noted, the hub 22 (and 22a and 22b) is placed on the rod 32 (and 32a and 32b) first, and secured by torquing the hub nut 40 (and 40a and 40b) to the desired prestress, and then locking it (as is done with usual piston nuts). Once installed, the hub 22 (and 22a and 22b) and nut 40 (and 40a and 40b) will not have to be disturbed to remove the piston 12 (and 12a and 12b). The number of studs 28 and nuts 30 will be such as is required to handle the specific rod loading. The studs 28, preferably are anaerobic set studs, and the nuts 30 locknuts, or hex-head capscrews or socket head capscrews can be used. Socket head capscrews would be preferable when low clearances are needed. Too, if capscrews are used, the aluminum piston 12 (and 12a and 12b) will have helicoil inserts.

While I have described my invention in connection with specific embodiments thereof, it is to be clearly understood that this is done only by way of example, and not as a limitation to the scope of the invention, as set forth in the objects thereof and in the appended claims.

I claim:

1. A piston and rod assembly, comprising:

a hollow piston, having (a) an axis, and (b) an opening formed in one axial end thereof, with (c) an annular ledge rimming said opening; wherein said ledge has a given plurality of tapped bores formed therein; and an annular hub, also having the same, given plurality of bolt holes formed therein;

said hub having a circumferential surface which pilotingly receives said piston opening thereabout; and fasteners set in said holes and fastened in said bores securing said hub to said ledge;

a piston rod, having a prominent shoulder formed thereon, and being threaded at one end thereof; wherein said hub has (a) a throughgoing bore which pilotingly receives said piston rod therein, and (b) a rim for seating thereof against said shoulder; and a nut threadedly torqued onto said one end of said rod and fastening said rim of said hub against said shoulder; wherein said hub has a plurality of radially disposed, rigidizing ribs.

2. A piston and rod assembly, according to claim 1, wherein:

said one end of said piston has a recess formed therein;

said hub has an annular flange; and said flange is nested in said recess.

3. A piston and rod assembly, according to claim 2, wherein:

said recess has an annular, flat land, perpendicular to said axis, which defines said ledge, and a circular wall which circumscribes said flange.

4. A piston and rod assembly, according to claim 2, wherein:

said fasteners comprise studs, and nuts torqued onto said studs and fixed against said flange; and said flange has countersunk holes, formed therein, in which said stud nuts are confined.

5. A piston and rod assembly, according to claim 2, wherein:

said recess has a circular wall surface with a given diameter; and said flange has a peripheral surface, confronting said wall surface, with a diameter slightly less than said given diameter, defining a minute, annular space between said surfaces.

6. A piston and rod assembly, according to claim 1, wherein:

said hub has an annular flange; and said flange is set against said ledge.

* * * * *